(12) United States Patent
Sanders et al.

(10) Patent No.: US 11,640,426 B1
(45) Date of Patent: *May 2, 2023

(54) BACKGROUND AUDIO IDENTIFICATION FOR QUERY DISAMBIGUATION

(71) Applicant: GOOGLE LLC, Mountain View, CA (US)

(72) Inventors: Jason Sanders, New York, NY (US); John J. Lee, Long Island City, NY (US); Gabriel Taubman, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/334,378

(22) Filed: May 28, 2021

Related U.S. Application Data

(63) Continuation of application No. 16/244,366, filed on Jan. 10, 2019, now Pat. No. 11,023,520, which is a continuation of application No. 13/795,153, filed on Mar. 12, 2013, now abandoned.

(60) Provisional application No. 61/654,518, filed on Jun. 1, 2012, provisional application No. 61/654,407, filed on Jun. 1, 2012, provisional application No. 61/654,387, filed on Jun. 1, 2012.

(51) Int. Cl.
*G06F 16/632* (2019.01)

(52) U.S. Cl.
CPC ................. *G06F 16/634* (2019.01)

(58) Field of Classification Search
None
See application file for complete search history.

(56) References Cited

U.S. PATENT DOCUMENTS

| | | | |
|---|---|---|---|
| 5,721,902 | A | 2/1998 | Schultz |
| 6,006,622 | A | 12/1999 | Bischof et al. |
| 6,345,252 | B1 | 2/2002 | Beigi et al. |
| 6,415,258 | B1 | 7/2002 | Reynar et al. |
| 6,454,520 | B1 | 9/2002 | Pickelman et al. |

(Continued)

FOREIGN PATENT DOCUMENTS

| | | |
|---|---|---|
| AU | 2005200340 | 2/2005 |
| EP | 2228737 | 9/2010 |

(Continued)

OTHER PUBLICATIONS

Checkik et al., "Large-scale content-based audio retrieval from text queries", Proceedings of the 1st ACM international conference on Multimedia information retrieval, pp. 106-112, 2008.

(Continued)

*Primary Examiner* — Augustine K. Obisesan
(74) *Attorney, Agent, or Firm* — Gray Ice Higdon

(57) ABSTRACT

Implementations relate to techniques for providing context-dependent search results. The techniques can include receiving a query and background audio. The techniques can also include identifying the background audio, establishing concepts related to the background audio and obtaining terms related to the concepts related to the background audio. The techniques can also include obtaining search results based on the query and on at least one of the terms. The techniques can also include providing the search results.

18 Claims, 4 Drawing Sheets

(56) References Cited

U.S. PATENT DOCUMENTS

| | | | |
|---|---|---|---|
| 6,584,439 B1* | 6/2003 | Geilhufe | G10L 15/26 |
| | | | 704/E15.045 |
| 7,027,987 B1 | 4/2006 | Franz et al. | |
| 7,089,188 B2 | 8/2006 | Logan et al. | |
| 7,783,620 B1 | 8/2010 | Chevalier et al. | |
| 8,131,716 B2 | 3/2012 | Chevalier et al. | |
| 8,352,467 B1 | 1/2013 | Guha | |
| 9,947,333 B1 | 4/2018 | David | |
| 2004/0225650 A1 | 11/2004 | Cooper et al. | |
| 2005/0154713 A1 | 7/2005 | Glover et al. | |
| 2006/0074883 A1 | 4/2006 | Teevan et al. | |
| 2006/0200431 A1 | 9/2006 | Dwork et al. | |
| 2006/0253427 A1 | 11/2006 | Wu et al. | |
| 2007/0071206 A1 | 3/2007 | Gainsboro et al. | |
| 2008/0005068 A1 | 1/2008 | Dumais et al. | |
| 2008/0005076 A1 | 1/2008 | Payne et al. | |
| 2008/0162471 A1* | 7/2008 | Bernard | G06F 16/3329 |
| | | | 707/999.005 |
| 2008/0215597 A1 | 9/2008 | Nanba | |
| 2008/0244675 A1 | 10/2008 | Sako et al. | |
| 2008/0250011 A1 | 10/2008 | Haubold et al. | |
| 2009/0006294 A1 | 1/2009 | Liu | |
| 2009/0018898 A1 | 1/2009 | Genen | |
| 2009/0157383 A1* | 6/2009 | Cho | G06F 16/3343 |
| | | | 704/8 |
| 2009/0228439 A1 | 9/2009 | Manolescu et al. | |
| 2010/0076996 A1 | 3/2010 | Hu et al. | |
| 2010/0145971 A1 | 6/2010 | Cheng et al. | |
| 2010/0204986 A1 | 8/2010 | Kennewick et al. | |
| 2011/0035382 A1 | 2/2011 | Bauer et al. | |
| 2011/0153324 A1 | 6/2011 | Ballinger et al. | |
| 2011/0257974 A1 | 10/2011 | Kristjansson et al. | |
| 2011/0273213 A1 | 11/2011 | Rama | |
| 2011/0295590 A1 | 12/2011 | Lloyd et al. | |
| 2011/0307253 A1 | 12/2011 | Lloyd et al. | |
| 2012/0034904 A1 | 2/2012 | Lebeau et al. | |
| 2012/0117051 A1 | 5/2012 | Liu | |
| 2012/0179465 A1 | 7/2012 | Cox et al. | |
| 2012/0239175 A1 | 9/2012 | Mohajer et al. | |
| 2012/0253802 A1 | 10/2012 | Heck et al. | |
| 2012/0296458 A1 | 11/2012 | Koishida et al. | |
| 2012/0296938 A1 | 11/2012 | Koishida et al. | |

FOREIGN PATENT DOCUMENTS

| | | |
|---|---|---|
| WO | 2007012120 | 2/2007 |
| WO | 2007064640 | 6/2007 |
| WO | 2012019020 | 2/2012 |

OTHER PUBLICATIONS

Egozi et al., "Concept-Based Feature Generation and Selection for Information Retrieval", Proceedings of the 23rd AAAI Conference on Artificial Intelligence, pp. 1132-1137, 2008.

Haus et al., "An Audio front end for query-by-humming systems", Proceedings of International Symposium on Music Information Retrieval, 2001.

Mobile Image Search With Multimodal Context-Aware Queries, Yang et al, IEEE Computer Society Conference on Computer Vision and Pattern Recognition—Workshops, p. 25-32, Jun. 2010.

Multimodal Photo Annotation and Retrieval on a Mobile Phone, Anguera et al, 2008.

Natsev et al., Semantic concept-based query expansion and re-ranking for multimedia retrieval, Proceedings of the 15th International Conference on Multimedia, pp. 991-1000, 2007.

* cited by examiner

BACKGROUND AUDIO IDENTIFICATION FOR QUERY DISAMBIGUATION

BACKGROUND

The techniques provided herein relate to query disambiguation.

Internet search engines provide information about Internet-accessible resources, e.g., web pages, documents, and images, in response to a user's query. A user can submit a query using a device, such as a mobile telephone, that includes a microphone. Sometimes users submit queries to internet search engines that are ambiguous in that they relate to more than one concept and/or entity.

SUMMARY

In general, one innovative aspect of the subject matter described in this specification can be embodied in methods that include the actions of receiving a search query, receiving background audio, identifying one or more concepts related to the background audio, generating a set of related terms related to the identified concepts, receiving search results based on the search query and on at least one of the terms related to the identified concepts, and providing the search results.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation may include all of the following features in combination. For example, receiving search results based on the search query and at least one at least one of the terms related to the identified concepts may include providing the query to a search engine, receiving scored results from the search engine, and altering a score for a search result containing at least one of the related terms. The method may further include determining an amount to alter the score by using a plurality of training queries. Alternatively, providing the search results may include providing only search results that satisfy a threshold score.

In another implementation, receiving search results based on the search query and at least on at least one of the terms related to the identified concepts may include providing the query to a search engine together with at least one of the related terms and receiving results from the search engine.

In yet another implementation, identifying concepts related to the background audio may include recognizing at least a portion of the background audio by matching it to an acoustic fingerprint and identifying concepts related to the background audio including concepts associated with the acoustic fingerprint.

Also, generating a set of terms related to the background audio may include generating a set of terms based on querying a conceptual expansion database based on the concepts related to the background audio.

Disclosed techniques provide certain technical advantages. Some implementations are capable of using background audio to clarify an ambiguous search query based on background audio. Such implementations provide more accurate search results, thus achieving a technical advantage.

The details of one or more embodiments of the subject matter of this specification are set forth in the accompanying drawings and the description below. Other features, aspects, and advantages of the subject matter will become apparent from the description, the drawings, and the claims.

DESCRIPTION OF DRAWINGS

The accompanying drawings, which are incorporated in and constitute a part of this specification, illustrate implementations of the described technology. In the figures.

Like reference numbers and designations in the various drawings indicate like elements.

DETAILED DESCRIPTION

Users gain information about internet-accessible resources by submitting a query to a search engine using a client device, such as a mobile telephone, which may be equipped with a microphone. Sometimes the user's query is ambiguous. For example, the user can submit the query "scorpions". Without more information, the search engine has no way to determine whether the user wants information on scorpion arthropods or the rock band Scorpions. However, if the search engine determined that the user submitted the query while listening to the Scorpions' song "Rock You Like A Hurricane", it could provide search results relevant to the rock band, instead of those relevant to the arthropods. Some implementations perform a search based on both the user's query and terms that are related to background audio present at, or around, a time of the search query's input. In this manner, implementations respond to search queries by taking into account the context of background audio. The context of background audio thus allows ambiguous queries to be matched to more relevant results.

Reference will now be made in detail to example implementations, which are illustrated in the accompanying drawings. Where possible the same reference numbers will be used throughout the drawings to refer to the same or like parts.

Figure 1A:
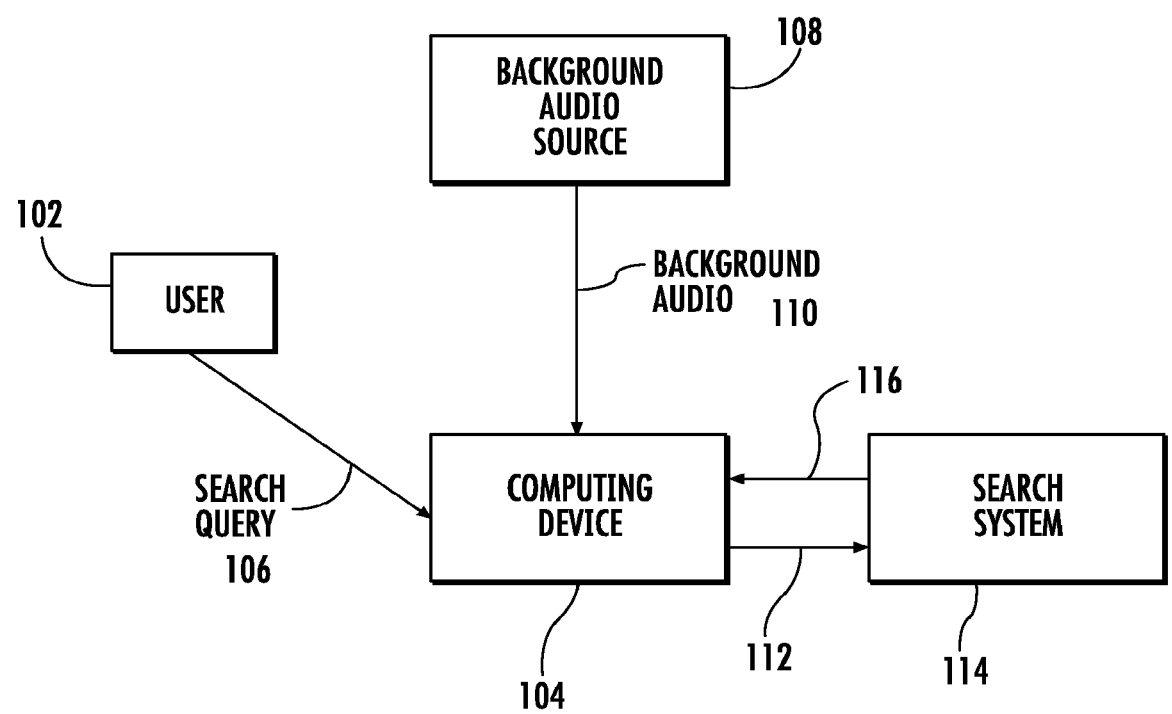
FIG. 1A is a schematic diagram of an example implementation.

FIG. 1A is a schematic diagram of an example implementation. Per FIG. 1A, user 102 provides voice input of a search query 106 to computing device 104. In some implementations, user 102 can provide search query 106 using a keyboard or other input device in lieu of voice input. In addition, background audio source 108, for example, a radio or television, provides background audio 110, which computing device 104 detects. Computing device 104 conveys search query 106 and background audio 110 to search system 114 through communications channel 112.

Search system 114 receives both search query 106 and background audio 110 through communications channel 112 from computing device 104. If necessary, search system 114 uses speech recognition to convert search query 106 to computer-readable form. Search system 114 utilizes techniques disclosed herein to identify background audio 110 and retrieve terms that are related to the background audio. For example, if the background audio is a popular song, search system 114 can retrieve a set of terms that include other songs by the same artist, the name of the album on which the song appears, the names of the performers, etc.

Search system 114 then executes search query 106 using at least one term related to the background audio. For example, search system 114 can supplement search query 106 with at least one term related to background audio 110 and submit the supplemented search query to a search engine for processing. As another example, search system 114 can execute the search using augmented match scores for search results that include terms related to background audio 110. Irrespective of the particular use of the terms related to background audio 110, search system 114 obtains search results, which search system 114 conveys through communications channel 116 back to computing device 104 for display or audio presentation to user 102.

Figure 1B:
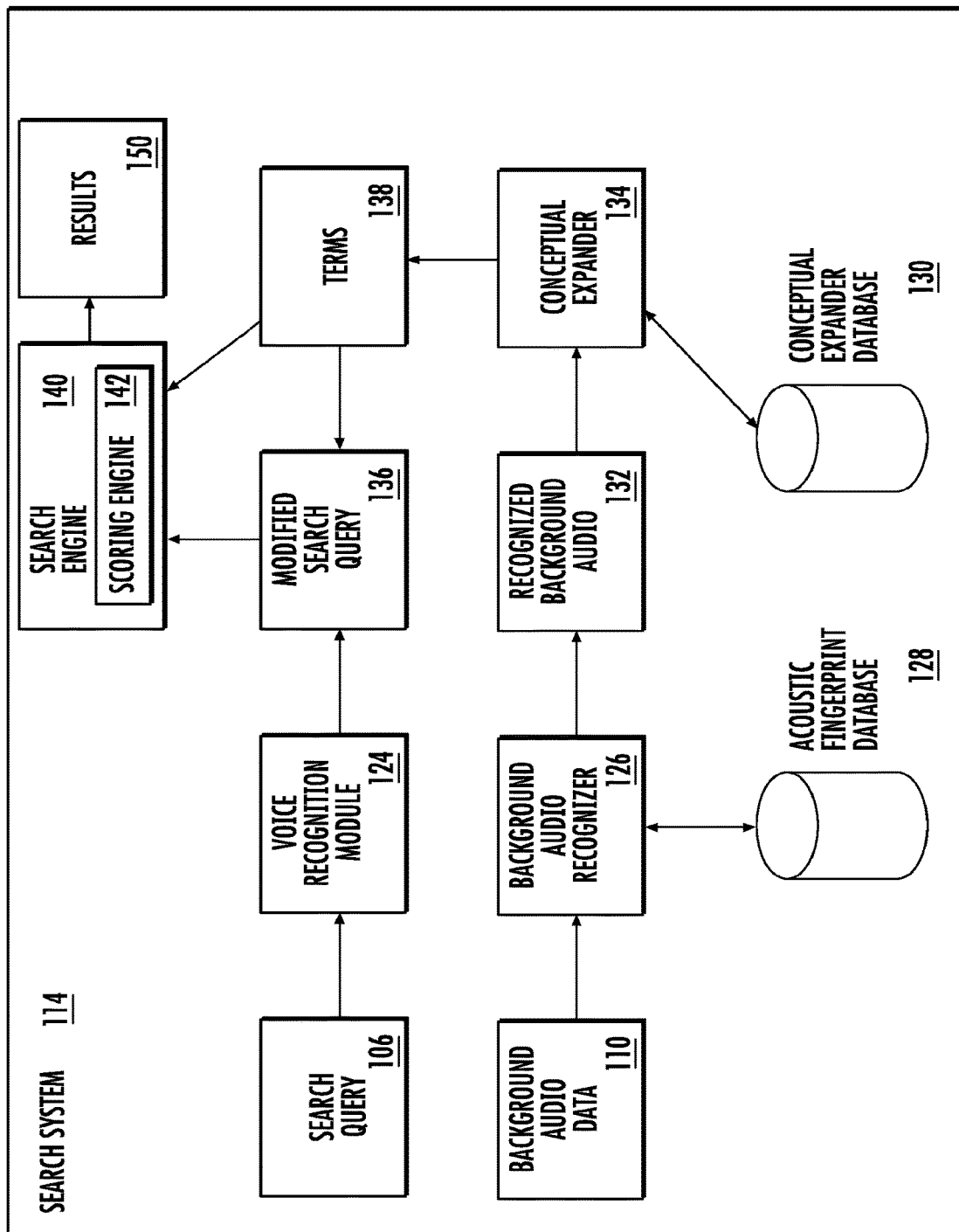
FIG. 1B is a schematic diagram of a search system included in an example implementation.

FIG. 1B is a schematic diagram of a search system included in an example implementation. Search system 114 includes various components. These components and their interaction allow improved searching that uses information provided from the background audio to permit such improved searching.

The operation of search system 114 involves with the receipt of search query 106 and background audio data 110 from computing device 104. Search query 106 includes parameters for a search that specify the desired results. However, these parameters may be ambiguous, especially if search query 106 includes keywords that have multiple meanings. Background audio data 110 may include audio such as music or the soundtrack to a video program that, when identified, is associated with certain concepts that can help narrow the scope of search query 106 by reducing ambiguity or otherwise providing information that helps improve the quality of the results obtained by searching with search query 106.

Search query 106 may optionally be processed by voice recognition module 124, in the case in which it is an audio query and it needs to be converted into a textual query, such as a natural language question or a set of keywords. However, if search query 106 is received as text to begin with, such as from a keyboard, then voice recognition module 124 may not be necessary for that implementation. Voice recognition module 124 is capable of receiving audio speech input and converting such input to computer readable data, for example, ASCII or Unicode text, using conventional techniques.

However, background audio data 110 requires processing in order to lead to results that allow it to help improve results for search query 106. Background audio data 110 is processed by background audio recognizer 126. Background audio recognizer 126 analyzes background audio data 110 and determines that background audio data 110 includes audio that corresponds to a known segment of audio. While one example of how audio may be a known segment of audio is if the audio includes audio from an existing media entity, such as an audio component of a television or movie, or a piece of music, it will be recognize that implementations may generally use any identifications that can be made from analyzing the background audio. For example, simple examples of identified background audio might be that dialogue from an episode of "The Simpsons" is playing in the background, or the song "Penny Lane" is playing in the background. However, other implementations might take advantage of other identifications, such as recognizing voices of participants in a background conversation or recognizing noises made by a certain type of animal.

Background audio source 108 may produce background audio 110 that user 102 may want to keep private or otherwise would prefer not to have recorded and/or analyzed. For example, background audio 110 may include a private conversation, or some other type of background audio 110 that user 102 does not wish to have captured. Even background audio that may seem innocuous, such as a song playing in the background, may divulge information about user 102 that user 102 would prefer not to have made available to a third party.

Because of the need to ensure that the user is comfortable with having the background audio processed in case the background audio includes content that the user does not wish to have recorded and/or analyzed, implementations should provide user 102 with a chance to affirmatively consent to the receipt of background audio 110 before receiving or analyzing audio that is received from background audio source 108. Therefore, user 102 may be required to take action to specifically indicate that he or she is willing to allow the implementations to capture background audio 110 before the implementations are permitted to start recording background audio 110. For example, computing device 104 may prompt user 102 with a dialog box or other graphical user interface element to alert user 102 with a message that makes user aware that computing device 104 is about to monitor background audio 110. For example, the message might state, "Please authorize use of background audio. Please note that information about background audio may be shared with third parties." Thus, in order to ensure that background audio 110 is gathered exclusively from consenting users, implementations should notify user 102 that gathering background audio 110 is about to begin, and furthermore that user 102 should be aware that the background audio 110 information that is accumulated may be shared in order to draw conclusions based on the background audio 110. Only after user 102 has been alerted to these issues, and has affirmatively agreed that he or she is comfortable with recording the background audio, will background audio 110 be gathered from background audio source 108. Furthermore, certain implementations may prompt the user 102 again to ensure that user 102 is comfortable with recording background audio 110 if the system has remained idle for a period of time, as the idle time may indicate that a new session has begun and prompting again will help ensure that user 102 is aware of privacy issues related to gathering background audio 110 and is comfortable having background audio 110 be recorded.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Background audio recognizer 126 is capable of identifying an audio sample using conventional techniques. For example, background audio recognizer 126 accepts as an input data reflecting a query audio sample, uses such information to match the query audio sample to a known audio sample, and outputs an identification of the known audio sample. Background audio recognizer 126 thus includes or is coupled to a database storing data reflecting a large number of audio samples, e.g., songs, television program audio, etc. Example data reflecting an audio sample can include a spectrogram of the sample, or derivations of a spectrogram of the sample, e.g., a hash of part of the spectrogram. The spectrogram can include or be represented by, for example, identified peaks, e.g., local maxima, in a frequency domain.

One way that background audio recognizer 126 may be able to recognize background audio data 110 is to use an acoustic fingerprint database 128. Acoustic fingerprint database 128 may communicate with background audio recognizer 126 to process background audio data 110 produce fingerprints of background audio data 110 that represent features of background audio data 110, and match those fingerprints to other fingerprints in acoustic fingerprint database 128. For example, background audio recognizer 126 may receive background audio data 110 and code fingerprints based on background audio data 110. By using those fingerprints as a query into acoustic fingerprint database 128, background audio recognizer 126 may be able to draw a conclusion, such as that an audio snippet of the Eagles' "Hotel California" is playing in the background.

After background audio recognizer 126 recognizes background audio data 110, it produces recognized background audio 132. The next stage performed by search system 114 is that recognized background audio 132 must be processed through conceptual expander 134.

The role of conceptual expander 134 is to take recognized background audio 132 and use the identification information for recognized background audio 132 to produce terms 138 that can influence the query to improve the results. Conceptual expander 134 is capable of returning, in response to an identification of an audio sample, terms related to such sample. Thus, mapping engine can include or be coupled to a relational database, and can map an identification of an audio sample to terms related to the audio sample in the database. Conceptual expander 134 may use a variety of approaches to produce terms 138. As an example way of doing this, the identification of recognized background audio 132 may be used as a query to search a conceptual expander database 130. Conceptual expander database 130 is an information repository that can map recognized background audio 132 to terms 138 that are related to it. Conceptual expander database 130 may accomplish this task in several ways, depending on its contents. For example, conceptual expander database 130 may include a variety of documents, such as articles related to various topics, and these documents may be mined for keywords related to concepts based on the background audio. For example, suppose that search query 106 is "Data Android" and background audio data 110 includes an audio snippet of the theme song from "Star Trek: The Next Generation." Background audio recognizer 126 can identify recognized background audio 132, and use this information with conceptual expander 134. For example, conceptual expander database 130 might include an article about "Star Trek: The Next Generation" that could be mined to produce terms 138 that are indicative of "Data Android" in that context. For example, terms 138 might be "Brent Spiner" or "Lieutenant Commander", rather than other senses of the terms "Data" and "Android."

One example of an information repository that can serve in the role of conceptual expander 134 is an interconnected network of concepts, for example a comprehensive collection of real-world entities, such as people, places, things, and concepts along with the relationships and factual attributes that describe them. Examples of such networks include the Google Knowledge Graph, or Wikipedia. These networks describe entities that are related to literals in specific ways. As discussed above, recognized background audio 132 may include information about terms related to background audio 110. If conceptual expander 134 uses such a network of concepts, it becomes possible to use the terms to identify entities and related literals, that can be considered for use in query disambiguation. For example, suppose that the recognized background audio 132 is a clip from the "Men in Black" theme song, sung by Will Smith. The network of concepts may serve in the role of conceptual expander 134 based on this information. Recognized background audio 132 leads the network of concepts to suggest certain entities as being relevant, based on recognized background audio 132. For example, the entities "Will Smith" and "Men in Black" might be derived from recognized background audio 132. Based on these entities, the network of concepts can then provide literals that have a relationship with these entities, defined by a schema. For example, the network of concepts can provide the date "Sep. 25, 1968" as having the "date of birth" relationship to "Will Smith," or "Tommy Lee Jones" as having a "lead actor" relationship to "Men in Black." Because the network of concepts may be a repository of entities that are associated with related literals, the network is well-suited to begin with entities derived from recognized background audio 132 and suggest related literals as terms 138 that expand the concepts and improve query performance.

Once conceptual expander 134 produces terms 138, search query 106, as recognized by voice recognition module 124, if necessary, can be combined to produce modified search query 136, and then get results using a search engine 140. This can be done either by concatenating one or more of terms 138 to search query 106 to produce modified search query 136, or by filtering the results of a search on search query 106 as recognized by voice recognition module 124. Continuing the example previously discussed, modified search query might take "Data Android" and add some of terms 138 to search on "Lieutenant Commander Data Android." Additionally, search engine 140 can filter results from searching on modified search query 136. For example, before search engine 140 returns results 150 to computing device 104, it may filter using terms 138. For example, only search results that include "Brent Spiner" might be provided as results 150. In one implementation, search engine 140 may include scoring engine 142 and scoring engine 142 may score results 150 based at least on on the relationship between results 150 and terms 138.

Thus, search system 114 includes search engine 140. Search engine 140 can include a web-based search engine, a proprietary search engine, a document lookup engine, or a different response engine. Search engine 220 may include an indexing engine, which includes an index of a large portion of the internet or other network such as a local area network (LAN) or wide area network (WAN). Search engine 140 may further include scoring engine 142. When search engine 114 receives a search query, it matches it to the index in order to retrieve search results. Scoring engine 142 attributes a score to each such search result, and search engine 142 ranks, e.g., orders, the search results based on the scores. Search engine 142 is thus capable of returning search results in response to a search query.

Search system 114 conveys the search query to search engine 140. If the user supplied the search query in computer readable form, search system 114 conveys the query directly to search engine 140. If the user supplied the search query to computing device 104 audibly, then search system 114 conveys the search query to voice recognition module 124 to obtain the search query in computer readable form, then provides the computer readable search query to search engine 140.

Search engine 140 processes the query taking into account at least one of the terms 138 related to the background audio. There are several ways that the system can accomplish this.

In some implementations, search engine 140 supplements the search query with the term, or terms, related to the background audio. In such implementations search engine 140 obtains search results based on this supplemented search query.

In some implementations, search engine 140 matches the terms of the search query to search results, and uses both the search query terms and the terms related to the background audio for scoring purposes using scoring engine 142. In such implementations, the terms related to the background audio are not used for matching purposes.

In some implementations, search engine 140 processes the query while taking into account the term, or terms, related to the background audio by augmenting scores attributed to search results matching the search query that also contain the term, or terms, related to the background audio. In implementations that use this technique, scoring engine 142 adds an amount to the scores of search results that also contain the term, or terms, related to the background audio.

Regardless as to the particular technique that search engine 140 uses to obtain search results 150, search system 114 conveys search results 150 back to computing device 104, which presents search results 150 on display 180 to the user and/or outputs an audio rendering of search results 150 to the user using speaker 182.

Figure 1C:
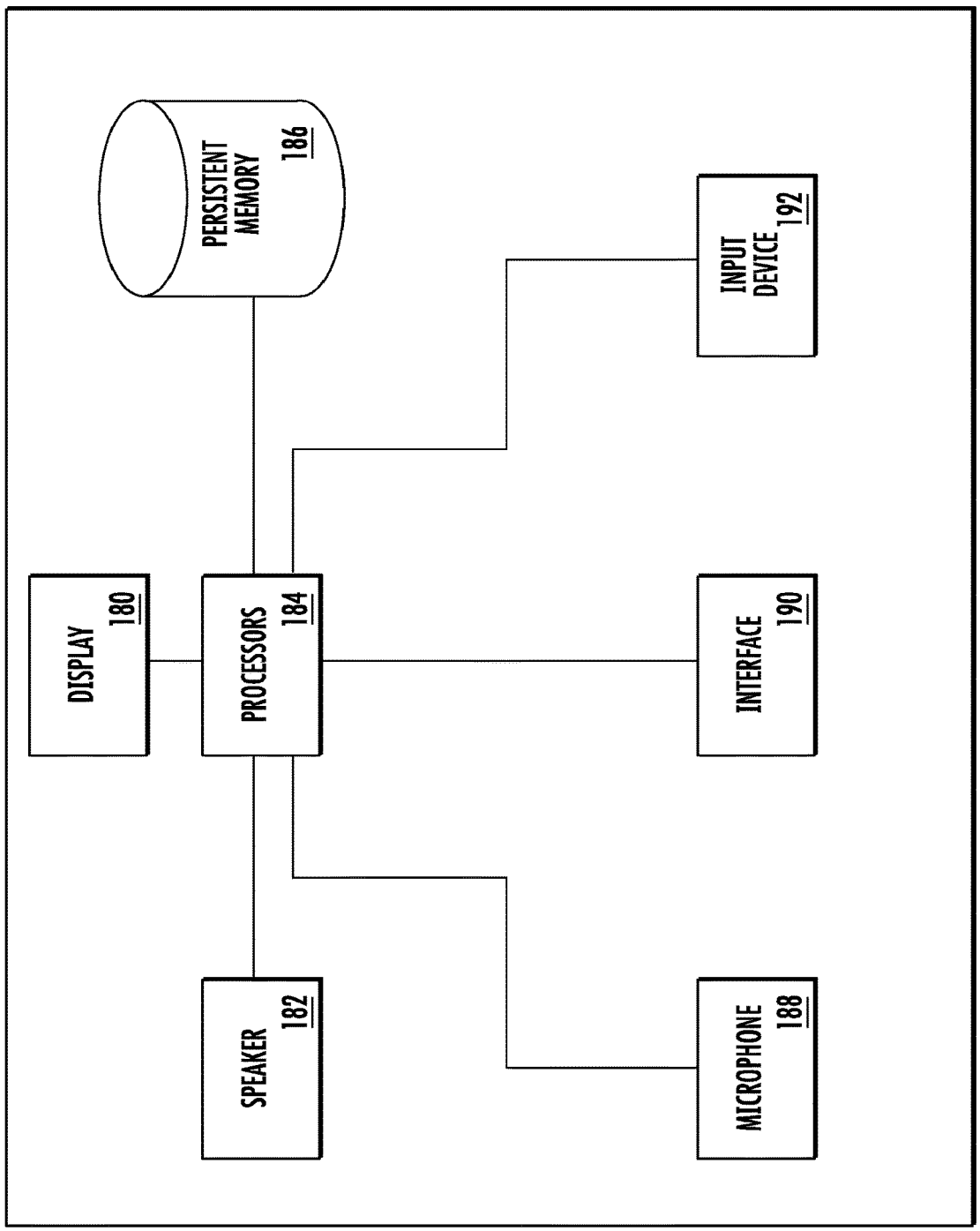
FIG. 1C is a schematic diagram of a computing device included in an example implementation.

FIG. 1C is a schematic diagram of a computing device included in an example implementation. In particular, FIG. 1C illustrates various hardware and other resources that can be used in implementations. Computing device 104 in some implementations can be a mobile telephone, a personal digital assistant, a laptop computer, a desktop computer, or another computer or hardware resource. Computing device 104 is communicatively coupled to search system 114 through communications channel 112 by way of interface 190. Interface 190 includes components of computing device 104 that allows computing device 104 to interact with other entities such as search system 114. Communications channel 112 can include, for example, a cellular communications channel, the internet, another network, or another wired or wireless data connection, in any combination.

Computing device 104 further includes one or more processors 184, which are coupled to various components. Thus, computing device 104 includes display 180. Display 180 can be, by way of non-limiting example, a liquid crystal display. In some implementations, display 180 can be a touchscreen. Further, if a touchscreen, display 180 can include a user interface, such as a virtual keyboard. Computing device 104 also includes input device 192. Input device 192 can be, for example, a physical keyboard, e.g., a keyboard that includes physical, as opposed to virtual, keys. In some implementations, input device 192 can be combined with display 180. As described above, display 18 can be implemented using a touchscreen, and in such implementations, the touchscreen can include a virtual keyboard as input device 192.

Computing device 104 may include microphone 188, which may be omnidirectional and capable of picking up background audio in addition to a user's voice input. Computing device 104 may further include speaker 182. Speaker 182 can be configured to output sound, such as that received over a telephone link. Alternately, or in addition, speaker 182 can output device-generated sound, such as tones or synthesized speech.

Thus, a user of computing device 104 provides a query to computing device 104 using, for example, microphone 188 or input device 192. Computing device 104 also receives, through microphone 188, any background audio that is present at or around the time of the query input. Computing device 104 sends search query 106 and the background audio 108 to search system 114 through communications channel 112. Search system 114 processes search query 106 and background audio 108 as discussed in FIG. 1B.

Figure 2:
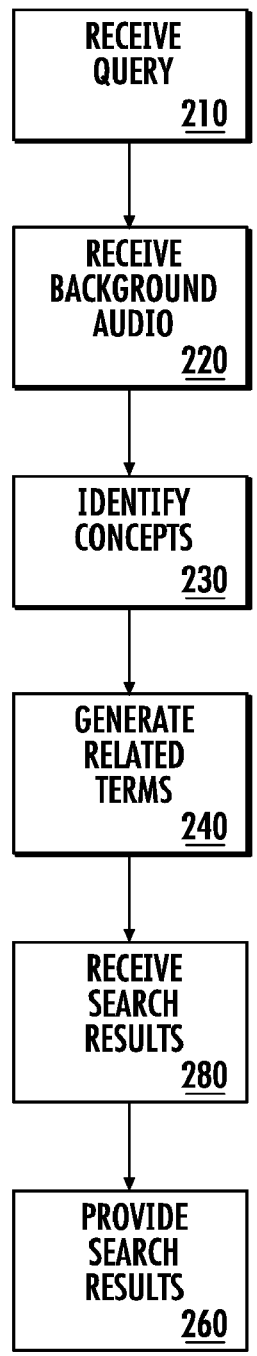
FIG. 2 is a flowchart of a method according to some implementations.

FIG. 2 is a flowchart of a method according to some implementations.

At block 210, computing device 104 receives a query from a user. The user can supply the query as a voice input using microphone 188, for example. Alternately, or in addition, in some implementations, the user can supply the query using input device 192.

At block 220, computing device 104 obtains background audio using, for example, microphone 188. Computing device 104 can gather such background audio while the user is entering or submitting a search query, whether the user enters the query as a voice input or in computer readable form. In some implementations, computing device 104 gathers background audio in a time interval that commences after the user has submitted the search query. That is, in some implementations, computing device 104 detects the background audio immediately after the user requests that the search query be executed, e.g., by activating an ENTER key or otherwise providing input that query entry is complete. The time interval can be any period of time from 0.1 seconds to 10 seconds. In some implementations, computing device 104 determines that the user has finished entering the search query as a voice input by detecting a drop below a threshold volume level. In some implementations, computing device 104 gathers background audio both before and after the user submits the search query.

At block 230, background audio recognizer 126 of voice recognition system 114 identifies concepts associated with the background audio to produce recognized background audio 132. One way in which this may occur is that background audio recognizer 126 may search an acoustic fingerprint database 128 using background audio data 110 to identify the nature of the background audio and the corresponding related concepts.

At block 240, conceptual expander 134 obtains terms related to the recognized background audio 132. One way in which this may occur is that recognized background audio 132 may search a conceptual expander database 130 that provides terms 138 associated with the concepts from recognized background audio 132.

If the background audio is a song, such related terms can include, for example, the song title, the song lyrics, the performing artist, the composer, the album, the titles for the other songs on the same album, and any other related information, e.g., from a relational database. If the background audio is a television program or movie audio segment, such related terms can include, for example, the actors, the producers, the title of the program or movie, the network, and any portions from a transcript of the program or movie. However, these are only example terms, and conceptual expander database 130 may include other terms suggested based on the identity of recognized background audio 132.

At block 250, search engine 140 obtains search results based on the search query and on at least one related term. The number of related terms that search engine 140 takes into account can vary. For example, the number of terms may vary from 1 to 15, but there is no absolute limit on the number of related terms. In some implementations, search engine 140 executes the search multiple times, each time with an additional related term, retaining only those search results whose score attributed by scoring engine 142 exceeds a threshold. There are several ways in which search engine 140 can obtain search results based on the query while taking into account the at least one related term.

In some implementations, search engine 140 supplements the search query with at least one term related to the background audio and executes the supplemented query in a conventional manner to obtain search results. In some implementations, search engine 140 provides an ordered set of search results.

In some implementations, search engine 140 matches the search query to search results using an indexing engine, requiring all terms from the search query to be present in the search result. In such implementations, search engine 140 allows the at least one term related to the background audio to be present in the matching search results, but does not require it. Instead, in such implementations, all terms, including those in the search query and those related to the background audio, count toward the score attributed to the matching results by scoring engine 142. Thus, in such implementations, search engine 140 processes the search query and at least one term related to the background audio in such a way as to require the terms from the search query to be present in the search results, but uses at least one term related to the background audio as an optional search term or terms. Search engine 140 then orders the results according to score. Search engine 140 thus obtains search results 150 for the search query while taking into account the background audio.

In some implementations, search engine 140 augments scores attributed to search results matching the search query that also contain at least one term related to the background audio. In implementations that use this technique for obtaining search results 150 for the search query while taking into account the background audio, search engine 140 matches the search query to search results using an indexing engine. Scoring engine 142 attributes a score to each such matched search result, and then adds an amount to the scores of search results that also contain at least one term related to the background audio. After scoring engine 142 adjusts each score as appropriate, search engine 140 ranks the results according to score. In this manner, search engine 140 obtains search results for the search query while taking into account the background audio.

For implementations in which scoring engine 142 adjusts scores for search results that include the term, or terms, related to the background audio, the amount of the adjustment can be set by fiat, or learned. There are several learning techniques that can be used.

In some implementations, the amount by which to increase scores can be learned by first obtaining a large set, e.g., 100-100,000, of ambiguous queries followed by related unambiguous queries. For each such query pair, the technique calculates the difference between the score of the highest ranked search result for the unambiguous query and the score attributed to the same search result for the ambiguous query. The technique then takes the average of these differences as the amount by which to increase search result scores.

Another technique for learning the amount to add utilizes a large set, e.g., 100-100,000, of ambiguous/unambiguous query pairs together with background audio for each pair. This technique determines the amount of score increase, denoted X, that maximizes the proportion of the large set of query pairs for which the following two conditions are satisfied: (1) the highest ranked ambiguous query search result does not appear in the top N unambiguous query search results, where N is fixed at any number from 1 to 25, in an example implementation, and (2) adding X to the score of each of the ambiguous query search results that contain terms related to the background audio causes the highest ranked ambiguous query search result to change as a result of such addition(s). The technique selects the value of X that maximizes the proportion of the query pairs for which conditions (1) and (2) are satisfied. To select such an X, the technique can use, for example, an exhaustive search, a gradient descent, or another methodology.

In implementations that rely on learning to set or adjust the score increase amount, the learning process can be ongoing, for example, as the system receives more and more search queries from users.

At block 260, search system 114 sends the search results to computing device 104 using communications channel 112. Computing device 104 receives the search results and presents them to the user using, for example, display 180 and/or speaker 182.

In general, systems capable of performing the disclosed techniques can take many different forms. Further, the functionality of one portion of the system can be substituted into another portion of the system. Each hardware component can include one or more processors coupled to random access memory operating under control of, or in conjunction with, an operating system. The search system can include network interfaces to connect with clients through a network. Such interfaces can include one or more servers. Further, each hardware component can include persistent storage, such as a hard drive or drive array, which can store program instructions to perform the techniques disclosed herein. That is, such program instructions can serve to perform techniques as disclosed. Other configurations of search system 114, computing device 104, associated network connections, and other hardware, software, and service resources are possible.

The foregoing description is illustrative, and variations in configuration and implementation can occur. Other resources described as singular or integrated can in implementations be plural or distributed, and resources described as multiple or distributed can in implementations be combined. The scope of the present teachings is accordingly intended to be limited only by the following claims.

What is claimed is:

1. A computer-implemented method comprising:
receiving (i) a search query including one or more query terms entered into a mobile computing device by a user, the search query being entered by the user speaking the search query during a first period of time during which a voice detection signal is above a threshold volume level, indicating the presence of the user's voice, and (ii) background audio that is not made by the user, and that is produced by a source in an environment surrounding the mobile computing device within a predetermined time of entry of the one or more query terms, the predetermined time of entry being outside of the first time period, and wherein the background audio includes audio that is detected during a second time period that is a fixed time interval and after the first time period during which the voice detection signal is below the threshold volume level, indicating an absence of the user's voice, the background audio being detected during the second time period in response to a determination by the mobile computing device that the voice detection signal has fallen below the threshold volume level;
identifying a known audio segment based on the background audio that is not made by the user, and that is produced by the source in the environment surrounding the mobile computing device within the predetermined time of the entry of the one or more query terms;
generating a set of related terms that describe entities that are associated in an entity-relationship model with the known audio segment that is identified based on the background audio that is not made by the user, and that is produced by the source in the environment surrounding the mobile computing device within the predetermined time of the entry of the one or more query terms;
modifying the search query to include, as query terms, one or more related terms of the set of related terms that describe entities that are associated in the entity-relationship model with the known audio segment that is identified based on the background audio that is not made by the user, and that is produced by the source in the environment surrounding the mobile computing device within the predetermined time of the entry of the one or more query terms;
receiving search results based on the modified search query; and
providing the search results.

2. The method of claim 1, wherein receiving search results based on the modified search query comprises:
providing the query to a search engine;
receiving scored results from the search engine; and
altering a score for a search result containing at least one of the related terms.

3. The method of claim 2, further comprising determining an amount to alter the score by using a plurality of training queries.

4. The method of claim 1, wherein providing the search results comprises providing only search results that satisfy a threshold score.

5. The method of claim 1, wherein identifying the known audio segment based on the background audio comprises:
recognizing at least a portion of the background audio by matching it to an acoustic fingerprint; and
identifying the known audio segment based on the background audio comprising the known audio segment associated with the acoustic fingerprint.

6. The method of claim 1, wherein generating the set of terms related to the background audio comprises:
generating the set of terms based on querying a database based on the known audio segment based on the background audio.

7. A system comprising:
one or more computers and one or more storage devices storing instructions that are operable, when executed by the one or more computers, to cause the one or more computers to perform operations comprising:
receiving (i) a search query including one or more query terms entered into a mobile computing device by a user, the search query being entered by the user speaking the search query during a first period of time during which a voice detection signal is above a threshold volume level, indicating the presence of the user's voice, and (ii) background audio that is not made by the user, and that is produced by a source in an environment surrounding the mobile computing device within a predetermined time of entry of the one or more query terms, the predetermined time of entry being outside of the first time period, and wherein the background audio includes audio that is detected during a second time period that is a fixed time interval and after the first time period during which the voice detection signal is below the threshold volume level, indicating an absence of the user's voice, the background audio being detected during the second time period in response to a determination by the mobile computing device that the voice detection signal has fallen below the threshold volume level;
identifying a known audio segment based on the background audio that is not made by the user, and that is produced by the source in the environment surrounding the mobile computing device within the predetermined time of the entry of the one or more query terms;
generating a set of related terms that describe entities that are associated in an entity-relationship model with the known audio segment that is identified based on the background audio that is not made by the user, and that is produced by the source in the environment surrounding the mobile computing device within the predetermined time of the entry of the one or more query terms;
modifying the search query to include, as query terms, one or more related terms of the set of related terms that describe entities that are associated in the entity-relationship model with the known audio segment that is identified based on the background audio that is not made by the user, and that is produced by the source in the environment surrounding the mobile computing device within the predetermined time of the entry of the one or more query terms;
receiving search results based on the modified search query; and
providing the search results.

8. The system of claim 7, wherein receiving search results based on the modified search query comprises:
providing the query to a search engine;
receiving scored results from the search engine; and
altering a score for a search result containing at least one of the related terms.

9. System of claim 8, wherein the operations further comprise determining an amount to alter the score by using a plurality of training queries.

10. The system of claim 7, wherein providing the search results comprises providing only search results that satisfy a threshold score.

11. The system of claim 7, wherein identifying the known audio segment based on the background audio comprises:
- recognizing at least a portion of the background audio by matching it to an acoustic fingerprint; and
- identifying the known audio segment based on the background audio comprising the known audio segment associated with the acoustic fingerprint.

12. The system of claim 7, wherein generating the set of terms related to the background audio comprises:
- generating the set of terms based on querying a database based on the known audio segment based on the background audio.

13. A non-transitory computer-readable storage device storing software comprising instructions executable by one or more computers which, upon such execution, cause the one or more computers to perform operations comprising:
- receiving (i) a search query including one or more query terms entered into a mobile computing device by a user, the search query being entered by the user speaking the search query during a first period of time during which a voice detection signal is above a threshold volume level, indicating the presence of the user's voice, and (ii) background audio that is not made by the user, and that is produced by a source in an environment surrounding the mobile computing device within a predetermined time of entry of the one or more query terms, the predetermined time of entry being outside of the first time period, and wherein the background audio includes audio that is detected during a second time period that is a fixed time interval and after the first time period during which the voice detection signal is below the threshold volume level, indicating an absence of the user's voice, the background audio being detected during the second time period in response to a determination by the mobile computing device that the voice detection signal has fallen below the threshold volume level;
- identifying a known audio segment based on the background audio that is not made by the user, and that is produced by the source in the environment surrounding the mobile computing device within the predetermined time of the entry of the one or more query terms;
- generating a set of related terms that describe entities that are associated in an entity-relationship model with the known audio segment that is identified based on the background audio that is not made by the user, and that is produced by the source in the environment surrounding the mobile computing device within the predetermined time of the entry of the one or more query terms;
- modifying the search query to include, as query terms, one or more related terms of the set of related terms that describe entities that are associated in the entity-relationship model with the known audio segment that is identified based on the background audio that is not made by the user, and that is produced by the source in the environment surrounding the mobile computing device within the predetermined time of the entry of the one or more query terms;
- receiving search results based on the modified search query; and
- providing the search results.

14. The storage device of claim 13, wherein receiving search results based on the modified search query comprises:
- providing the query to a search engine;
- receiving scored results from the search engine; and
- altering a score for a search result containing at least one of the related terms.

15. The storage device of claim 14, wherein the operations further comprise determining an amount to alter the score by using a plurality of training queries.

16. The storage device of claim 13, wherein providing the search results comprises providing only search results that satisfy a threshold score.

17. The storage device of claim 13, wherein identifying the known audio segment based on the background audio comprises:
- recognizing at least a portion of the background audio by matching it to an acoustic fingerprint; and
- identifying the known audio segment based on the background audio comprising the known audio segment associated with the acoustic fingerprint.

18. The storage device of claim 13 wherein generating the set of terms related to the background audio comprises:
- generating the set of terms based on querying a database based on the known audio segment based on the background audio.

* * * * *